US006295188B1

(12) United States Patent
Ebersohl

(10) Patent No.: US 6,295,188 B1
(45) Date of Patent: Sep. 25, 2001

(54) METHOD OF CLOSING A CIRCUIT BREAKER SYNCHRONOUSLY

(75) Inventor: Gérard Ebersohl, La Mulatiere (FR)

(73) Assignee: Alstom T&D SA, Paris (FR)

( * ) Notice: Subject to any disclaimer, the term of this patent is extended or adjusted under 35 U.S.C. 154(b) by 0 days.

(21) Appl. No.: 09/227,886

(22) Filed: Jan. 11, 1999

(30) Foreign Application Priority Data

Dec. 1, 1998 (FR) .............................................. 98 00 190

(51) Int. Cl.[7] ....................................................... H02H 3/00
(52) U.S. Cl. .................................... 361/3; 361/6; 361/115
(58) Field of Search .................................... 361/3, 2, 5, 6, 361/13, 115, 93.1, 71, 72

(56) References Cited

U.S. PATENT DOCUMENTS 4,306,263 * 12/1981 Gray .......................................... 361/3

FOREIGN PATENT DOCUMENTS 0 574 300 A1 12/1993 (EP) ................................ H02H/7/22
2 711 279 A1 4/1995 (FR) ................................ H02H/3/027

* cited by examiner

*Primary Examiner*—Stephen W. Jackson
(74) *Attorney, Agent, or Firm*—Sughrue, Mion, Zinn, Macpeak & Seas, PLLC

(57) ABSTRACT

A method of synchronously closing a hydraulically-controlled circuit breaker connected in an AC network, the method including, for each pole of the circuit breaker, using a microcontroller connected to the hydraulic control system via static switches to perform the following steps:

on receiving a closure order, controlling the static switches to close the pole;

waiting for a signal indicating that the pole has moved a certain distance between its open position and its closed position;

on receiving the signal controlling the static switches to cause the pole to open;

detecting when the network voltage passes through a zero value; and waiting for a certain amount of time to elapse measured from the detection prior to controlling the static switches to cause the pole to close, the time lapse being such that full closure of the pole takes place at a moment that coincides with the instant at which the network voltage reaches a characteristic value depending on the nature of the load to be connected.

16 Claims, 2 Drawing Sheets

METHOD OF CLOSING A CIRCUIT BREAKER SYNCHRONOUSLY

The invention relates to an improvement to causing a hydraulically-controlled circuit breaker to close synchronously, in particular a very high voltage circuit breaker placed in an AC network.

BACKGROUND OF THE INVENTION

In most cases when such a circuit breaker is closed on a load placed in an AC network, transient current and/or voltage conditions are observed.

The amplitudes of such conditions depend on the nature of the load (line, reactance, transformer, bank of capacitors, . . . ) and also on the instant in the voltage period when connection actually takes place.

In order to minimize such transient conditions which give rise to voltage and/or current surges in the network, so-called "synchronous" closure controls have already been designed to close each pole of the circuit breaker in a manner that is controlled to coincide with an instant in the voltage period when the transient conditions are zero for voltage or for current. By way of example, in FIG. 1, applying voltage to a shunt reactance is optimum in terms of transient current conditions if voltage is applied at the instant marked t2 which coincides with an instant when the voltage is at an extremum Vmax: under such conditions, the current that is established in the load at instant t2 does not have any transient conditions and obeys the sinewave $I=I_{max}\cdot\sin\omega(t-t2)$. This result can be obtained by applying two appropriate successive time delays starting from the instant marked t0 at which the control system receives the order to close a pole:

- a time delay K1 measured from an instant when the voltage is zero; and
- a time delay K2 which is theoretically constant, corresponding to the time lapse required for closing the pole at an instant t2, as measured from instant t1. This time delay is associated essentially with the time required K2' mechanically to drive the contacts of the circuit breaker, and to the prestriking time for the electric arc K2" which is struck between the contacts of the pole (which time is always constant).

Successful synchronous closure of a circuit breaker pole therefore depends particularly on the duration K2' required for the circuit breaker to operate under hydraulic control remaining constant over time. By way of example, for a network operating at 60 Hz, and when closing on a reactance, the maximum acceptable current under transient conditions requires closure to take place at a maximum voltage value Vmax with precision that is better than or equal to 1 ms.

It has been observed that in hydraulically-controlled circuit breakers using "very cold weather" oils, the repetitiveness of the mechanical time K2' is reliable over the temperature range −40° C. to +50° C. with the required accuracy, providing switching operations are very frequent. However, if the circuit breaker has remained open-circuit for a long period of time (e.g. several months), experience shows that the mechanical time K2' required on first closure following said standby period is subject to an amount of error that is incompatible with synchronous closure. The origin of this error is associated with the phenomenon known as "gumming" that occurs in the synthetic rubber sealing rings that serve to provide sealing around the outlet shafts of the hydraulic control system. This difficulty is particularly significant in that the parameters that influence this error, in addition to the standby time, are numerous and poorly known.

OBJECT AND SUMMARY OF THE INVENTION

The object of the invention is to remedy that difficulty in simple manner.

To this end, the invention provides a method of synchronously closing a hydraulically-controlled circuit breaker connected in an AC network, the method consisting, for each pole of the circuit breaker, in using a microcontroller connected to the hydraulic control system via static switches to perform the following steps:

on receiving a closure order, controlling the static switches to close said pole;

waiting for a signal indicating that said pole has moved a certain distance between its open position and its closed position;

on receiving said signal, controlling the static switches to cause said pole to open;

detecting when the network voltage passes through a zero value; and waiting for a certain amount of time to elapse measured from said detection prior to controlling the static switches to cause said pole to close, said time lapse being such that full closure of said pole takes place at a moment that coincides with the instant at which the network voltage reaches a characteristic value depending on the nature of the load to be connected, e.g. an extremum when a shunt reactance is involved.

Advantageously, if a high degree of synchronous closure accuracy is required, the sequence—controlling the static switches to close said pole; waiting for a signal indicating that said pole has moved a certain distance between its open position and its closed position; on reception of said signal, controlling the static switches to open said pole—is repeated a plurality of times. Accuracy can be further improved if the microcontroller measures the time between the instant when it controls the static switches to close said pole and the instant when it receives said signal indicating a certain displacement of said pole between its open position and its closed position, and repeats said sequence until said measured time is equal to a prescribed value.

BRIEF DESCRIPTION OF THE DRAWINGS

An implementation of the method of the invention is described below in detail and is shown in the drawings.

MORE DETAILED DESCRIPTION

Figure 1:
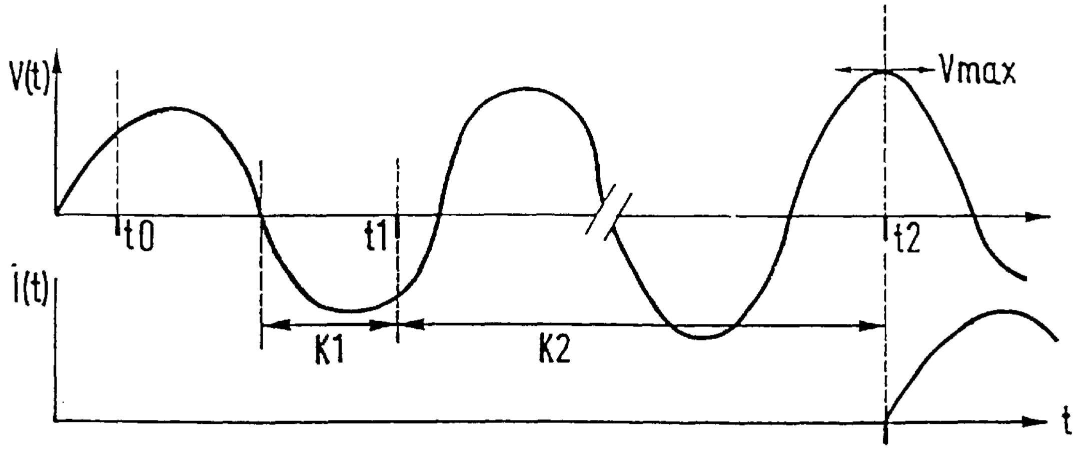
FIG. 1 shows in highly diagrammatic manner the critical instants in controlling closure as a function of the voltage an the current on an AC network.

In FIG. 1, it is recalled that t0 corresponds to the instant at which the control system receives a closure order; t2 corresponds to the instant at which closure of a pole becomes effective and it coincides with an instant at which the voltage V(t) is at a characteristic value; t1 corresponds to the instant at which the hydraulic control system is triggered to close the pole; K1 and K2 are explained above. K2 is generally previously established on the basis of experimental measurements. K1 is calculated on the basis of the following relationship: K1+K2 is an integer multiple of one-fourth of the voltage period of the network, K1 being positive. By way of example, for a 50 Hz network, if K2 is 17 ms, then K1 is 3 ms.

Figure 2:
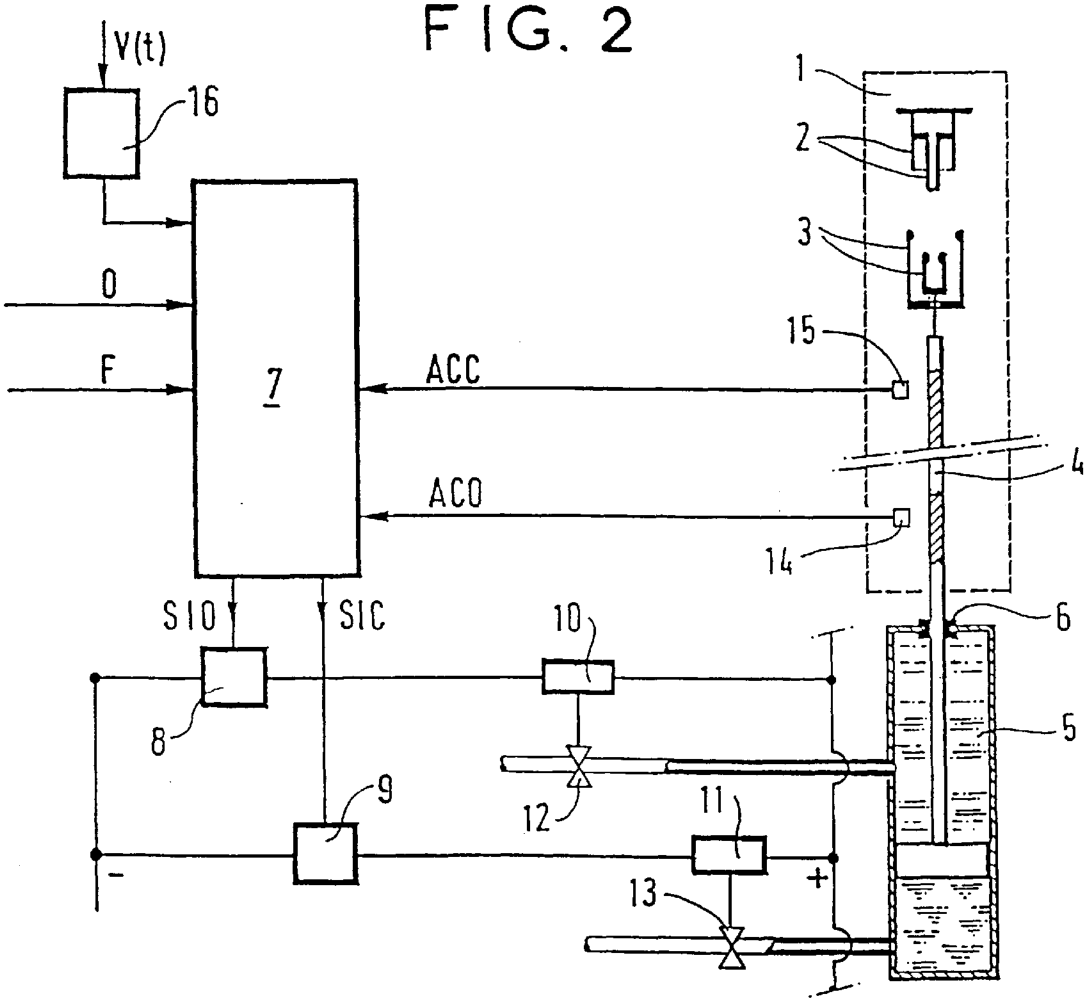
FIG. 2 is highly diagrammatic, showing the architecture of a digital control system for synchronously closing a circuit breaker in order to implement the method of the invention, for the case where the load to be put under voltage is a reactance.

FIG. 2 is a highly diagrammatic view of a synchronous closure control system of digital architecture for one pole 1 of a circuit breaker having fixed power contacts 2 and moving power contacts 3. The moving contacts 3 are moved in the pole by a drive rod 4 driven by an actuator 5 having sealing O-rings 6. Hydraulic control of the actuator includes coils 10, 11 which act on solenoid valves 12, 13. The closure command proper essentially comprises a microcontroller 7 connected to the coils 10, 11 by static switches 8, 9. The microcontroller is also connected to position sensors 14 and 15 associated with the displacement of the moving contacts. This digital architecture for the control system is described in greater detail in French patent No. FR 2 692 085. The normal operation of such a closure control system is as follows. When the pole is open, the position sensor 14 sends a signal ACO to the microcontroller 7 representing the open state of the pole, while the controller keeps the static switches 8 and 9 open.

When the microcontroller receives a closure order F, it sends a signal SIC that closes static switch 9, thereby powering coil 11 and activating closure valve 13. The actuator 5 drives the rod 4 associated with the moving contacts. A certain amount of displacement of the moving contacts 3 deactivates the sensor 14, e.g. a displacement of 12 mm for a total stroke of 170 mm, and this is detected by the microcontroller 7 which no longer receives the signal ACO. The microcontroller ceases to deliver the signal SIC to the static switch 9 which therefore opens, however that does not control the valve 13 which remains open because of hydraulic feedback (not shown).

When the stroke of the actuator is such that the moving contacts have closed on coming within about 12 mm of their final stroke, the sensor 15 provides a signal ACC which is detected by the microcontroller 7. The conventional closure operation has terminated. When the microcontroller receives an open order O, it causes static switch 8 to be closed by means of a signal SIO, thereby powering the coil 10 which activates the opening solenoid valve 12. The pole is opened in a manner that is symmetrical to closure thereof insofar as the sensors 14 and 15 are concerned.

Figure 3:
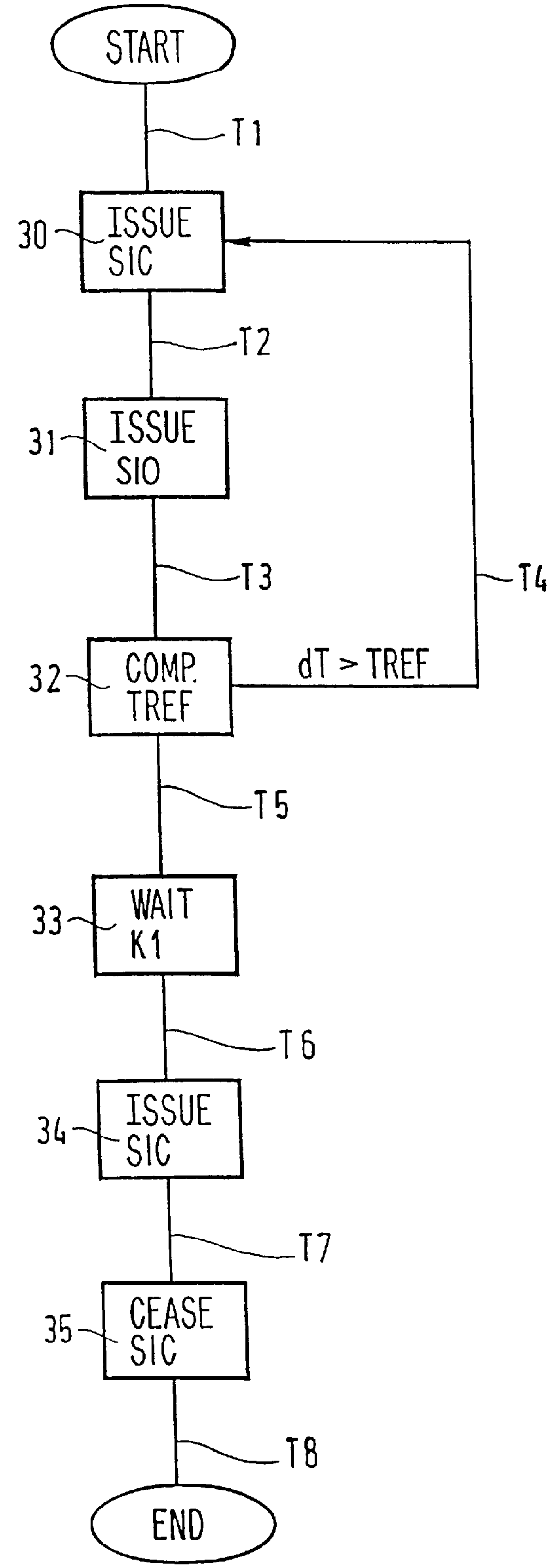
FIG. 3 is a flow chart showing the operation of such digital control for synchronous closure on a reactance.

With reference now to the flow chart of FIG. 3, made up of transitions and of states, synchronous closure of the pole 1 on a reactance with elimination of the gumming effect due to O-ring 6 takes place as follows.

At transition T1, on receiving a closure order F and a signal ACO indicating that the pole is in the open state, the microcontroller 7 (stage 30) delivers the signal SIC to the static switch 9 which actuates the closure solenoid valve 13 and starts a clock H.

At transition T2, on detecting that the signal ACO is no longer received, which absence of the signal ACO means that the pole is no longer open, the microcontroller 7 stops the clock H which has measured a time dT, ceases to apply the closure signal SIC to the static switch 9, and sends the opening signal SIO to the static switch 8 for a relatively long period of time K3 of about 30 ms, i.e. the time required to open the pole completely (stage 31). The length of the waiting time dT can be longer or shorter as a function of the gumming effect exerted by the O-ring 6. It should be observed that the microcontroller passes via transition T2 as soon as the actuator has succeeded in overcoming the gumming effect, i.e. once the rod 4 has been able to travel a stroke of at least 12 mm.

At transition T3, on detecting reception of the signal ACO indicating that the pole has opened, the microcontroller 7 compares the measured time dT with a reference threshold TREF (stage 32). During this stage, the microcontroller 7 can calculate the time delay K1 as mentioned above.

At transition T4, if dT is greater than TREF, the microcontroller 7 returns to processing at stage 30. It should be observed that this loop can be repeated as often as necessary until a constant value dT is obtained guaranteeing that the gumming effect of the actuator gasket has indeed been eliminated.

At transition T5, if dT is less than or equal to REF, and if the microcontroller detects that the network voltage V(t) has passed through a zero value (which voltage is digitized in a converter 16 connected to the microcontroller), processing continues at stage 33 in which the microcontroller starts the time delay of duration K1.

At transition T6, when the time delay K1 has elapsed, the microcontroller sends the closure signal SIC (stage 34) to the static switch 9 which actuates the solenoid valve 13 to enable the pole to close synchronously.

At transition T7, from the instant the microcontroller 7 no longer receives the signal ACO, which absence of the signal ACO means that the pole is no longer open, the microcontroller ceases to deliver the closure signal SIC to the static switch 9 (stage 35).

It will be understood that the method of the invention can be associated with an additional sensor placed between the sensors 14 and 15 so as to allow the actuator to operate over a larger stroke during the sequence for eliminating the gumming effect. In particular, this signal supplied by an additional sensor can be used to adjust the time dT. Furthermore, the microcontroller can easily be programmed to operate in real time to correct the time delay K2 as a function of other parameters such as temperature, oil pressure in the actuator, and the voltage +T-T applied to the coils 10 and 11 of the solenoid valves, so as to obtain synchronous closure even more precisely.

What is claimed is:

1. A method of synchronously closing a hydraulically-controlled circuit breaker connected in an AC network by using a hydraulic control system and static switches, the method, for each pole of said circuit breaker, comprising:

a) on receiving a closure order, controlling said static switches to begin closing said pole;

b) waiting for a signal indicating that said pole has moved a certain distance between its open position and its closed position;

c) on receiving said signal, controlling the static switches to cause said pole to stop closing and return to said open position;

d) detecting when the network voltage passes through a zero value; and e) waiting for a calculated amount of time to elapse measured from said detection time, and then controlling the static switches to cause said pole to close, said time lapse being such that full closure of said pole takes place at a moment that substantially coincides with the instant at which the network voltage reaches a characteristic value.

2. The method according to claim 1, in which steps a, b and c are repeated a plurality of times.

3. The method according to claim 2, further comprising, for each repetition, measuring the time between the beginning of closing in step a and the instant of receipt in step c of said signal indicating a certain distance traversed by said pole between its open position and its closed position, wherein the repeating continues until said measured time is equal to a prescribed value.

4. The method according to claim 1, wherein the certain distance depends upon a gumming effect experienced by at least one sealing o-ring of an actuator that moves the pole.

5. The method according to claim 3, wherein said certain distance is selectably adjustable in order to vary a range used for said measuring of the time.

6. The method according to claim 1, wherein step b comprises waiting for a plurality of signals each indicating that said pole has moved a certain distance between its open position and its closed position, and wherein step c comprises controlling the static switches to cause said pole to stop closing and return to its open position on receiving said plurality of signals.

7. The method according to claim 1, further comprising correcting said calculated amount of time as a function of at least one of a temperature, an actuator oil pressure, and a voltage applied via said static switches for opening or closing said pole.

8. The method according to claim 1, wherein said characteristic value depends on a nature of a load to be connected by said full closure of the pole.

9. The method according to claim 8, wherein the characteristic value is a voltage across a reactive load.

10. The method according to claim 1, wherein steps a, b, and c are repeated until a gumming effect is acceptable.

11. A computer system adapted to synchronously close a hydraulically-controlled circuit breaker having individual poles and connected in an AC network, comprising:

a processor; and a memory including software instructions adapted to enable the computer system to perform the steps of:

a) controlling a hydraulic control system to begin closing one of said poles;

b) waiting for an indication that said pole has moved a certain distance between its open position and its closed position;

c) on receiving said indication, controlling the static switches to cause said pole to stop closing and return to an open position;

d) repeating steps a, b, and c until a gumming effect is acceptable;

e) detecting when the network voltage passes through a zero value; and f) waiting for a calculated amount of time to elapse measured from said detection time and then controlling the static switches to cause said pole to close, said time lapse being such that full closure of said pole takes place at a moment that substantially coincides with the instant at which the network voltage reaches a characteristic value.

12. The computer system according to claim 11, wherein said memory further includes software instructions adapted to enable the computer system to perform the step of measuring the time between the beginning of closing of step a and the instant of receipt in step c of said signal indicating a certain displacement of said pole between its open position and its closed position, wherein in step d the gumming effect is acceptable when said measured time is equal to a prescribed value.

13. The computer system according to claim 12, wherein said software instructions are adapted so that said certain displacement is selectably adjustable in order to vary a range used for said measuring of the time.

14. The computer system according to claim 11, wherein said software instructions are adapted so that step b comprises waiting for a plurality of signals each indicating that said pole has moved a certain distance between its open position and its closed position, and so that step c comprises controlling the static switches to cause said pole to stop closing and start opening on receiving said plurality of signals.

15. The computer system according to claim 11, wherein said software instructions are adapted to enable the computer system to perform the further step of correcting said calculated amount of time as a function of at least one of a temperature, an actuator oil pressure, and a voltage applied via said static switches for opening or closing said pole.

16. The computer system according to claim 11, wherein said software instructions are adapted so that said characteristic value is selected depending on a nature of a load to be connected by said full closure of the pole.

* * * * *